United States Patent [19]

Onodera

[11] Patent Number: 4,612,911
[45] Date of Patent: Sep. 23, 1986

[54] STEAMER OF STEAM CIRCULATION SYSTEM

[76] Inventor: Masakichi Onodera, 6-27-306, Imazunaka 3-chome, Tsurumi-ku, Osaka, Japan

[21] Appl. No.: 779,093

[22] Filed: Sep. 23, 1985

[51] Int. Cl.$^4$ ................................................ F24D 1/00
[52] U.S. Cl. ...................................... 126/369; 99/477
[58] Field of Search ........................ 126/369, 377, 20; 99/473, 474, 477; 219/362, 401

[56] References Cited

U.S. PATENT DOCUMENTS

| | | | |
|---|---|---|---|
| 3,592,668 | 7/1971 | Denk | 99/447 X |
| 3,910,175 | 10/1975 | Smith | 99/474 |
| 3,934,497 | 1/1976 | Hannah | 126/369 X |
| 4,426,923 | 1/1984 | Ohata | 126/369 X |

FOREIGN PATENT DOCUMENTS

| | | | |
|---|---|---|---|
| 1236498 | 6/1960 | France | 99/473 |
| 255767 | 10/1970 | U.S.S.R. | 99/473 |

*Primary Examiner*—Randall L. Green
*Attorney, Agent, or Firm*—Wenderoth, Lind & Ponack

[57] ABSTRACT

A steamer in a steam circulation system can steam goods being transferred by a conveyor. A steam-jetting pipe is placed under the conveyor, a steam-sucking pipe is placed above the conveyor and an ejector condenser is placed on the way of primary steam heading for the steam-jetting pipe, provided the steam-sucking pipe is connected to the ejector condenser in order to feed back spent steam. A jet of fresh steam ascends in a walled room so as to steam goods on the conveyor and spent steam having increased humidity is sucked to return to the ejector condenser. Primary steam passing through the ejector condenser absorbs spent steam collected by the steam-sucking pipe so as to adjust the moisture content. Since spent steam is recovered and re-used, energy and consumption of primary steam are saved greatly, which can result in a wide cost reduction.

4 Claims, 3 Drawing Figures

STEAMER OF STEAM CIRCULATION SYSTEM

BACKGROUND OF THE INVENTION

1. Field of the Invention

This invention relates to a steamer in a steam circulation system equipped with a conveyor. More particularly, this invention relates to a steamer designed to use steam most efficiently in cooking, for example.

2. Description of the Prior Art

FIG. 3 shows a conventional steamer provided with a spiral conveyor. That is, the spiral conveyor 12 passes near the bottom of a warmth-retaining room 11 toward an entrance 14 thereof, turns back out of there, coils around a drum 13 and travels under the ceiling toward an exit so as to turn back out of there too. The spiral part of the conveyor 12 around the drum 13 is enclosed with walls 16. A pipe provided with many nozzles for jetting steam upward is laid on the walled room walls 16 beneath the conveyor 12. Therefore, goods traveling on the conveyor 12 are steamed by a steam jet from the pipe. Another pipe 18 for heating steam is provided above the conveyor 12 inside the walled room 11 and is used to adjust the dryness of the steam.

Incidentally, a steamer like the above prior art device consumes plenty of steam and boosts the steaming cost because most steam condenses and turns into water within the room walls 16 and the rest is purged from the exit 15. Additionally, adjusting the humidity of steam requires more steam, so that the steaming cost increases much more.

SUMMARY OF THE INVENTION

Under the circumstances, it is an object of this invention to provide a steamer capable of saving steam and cutting down on the steaming cost. It is another object of this invention to provide a steamer that can keep the humidity of steam so constant as to make it do without a heating device and that renders construction much simpler.

The above and other objects and features of the invention will appear more fully hereinafter from a consideration of the following description taken in connection with the accompanying drawing wherein one example is illustrated by way of example.

DETAILED DESCRIPTION OF THE PREFERRED EMBODIMENTS

Figure 1:
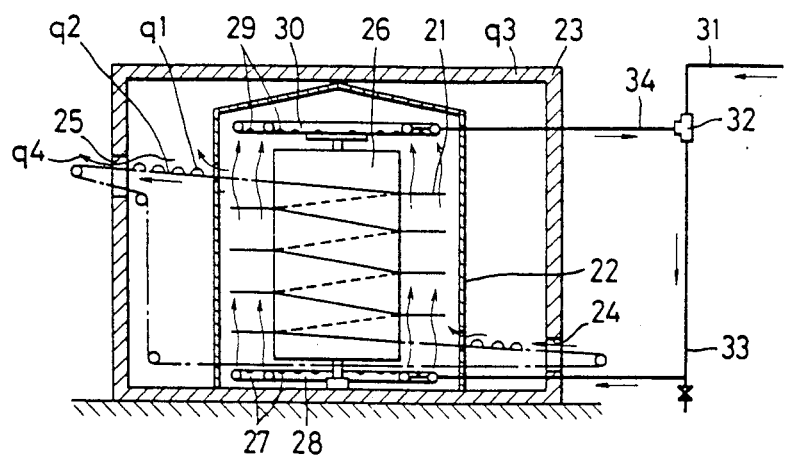
FIG. 1 is a longitudinal cross-sectional view of the first example of a steamer of this invention.

FIG. 1 shows one of the most preferable steamers embodied by this invention in which a spiral conveyor 21 is used. The spiral part of the conveyor 21 is housed in a room with heat-insulating walls 22. An extended part of the conveyor 21 passes through the walls 22 and travels in a warmth-retaining room 23, except that it turns back out of the room 23 at an entrance 24 and an exit 25. A drum 26 of the spiral conveyor 21 is of the closed type; a circular pipe 28 with many holes 27 for jetting steam is disposed beneath the conveyor 21 and another circular pipe 30 with many holes 29 for sucking steam is disposed under the ceiling within the walls 22.

Dried and heated primary steam passing a pipe 31, an ejector condenser 32 and a pipe 33 reaches the circular pipe 28; spent steam staying in the upper part of the walls 22 is sucked into the circular pipe 30 and is allowed to go to the ejector condenser 32 by way of a returning pipe 34. The spent secondary steam thus collected in the ejector condenser 32 is mixed there with the primary steam having passed through the pipe 31 and fed toward the pipe 33.

The structure is such that steam used to steam goods on the conveyor loses heat but is sucked into the circular pipe 30 by the action of the ejector condenser 32 before turning into water droplets because a stream of heated fresh steam is always fed into the ejector condenser 32. The spent secondary steam returning to the ejector condenser 32 is mixed with dried, fresh primary steam fed from the pipe 31.

The secondary steam circulates like this heated and dried steam; therefore, the replacement of steam is prompted within the walls 22 and steam does not condense into water. Consequently, steam consumption is greatly reduced and steaming can be performed efficiently with low energy and cost.

As best seen from the first example of this invention, the longer the conveyor 21, the more it has to be spiraled and the higher the equipment has to be built. However, as long as the recovering of steam is concerned, it has nothing to do with the length of the conveyor 21; thus, attaching an appropriately sized circular pipe 30 to the ceiling above the walls 22 will do for the purpose of scavenging steam from the entire upper portion of the unit. Thus, according to the invention, recovering steam can be made at lowest cost and greatest efficiency.

Figure 3:
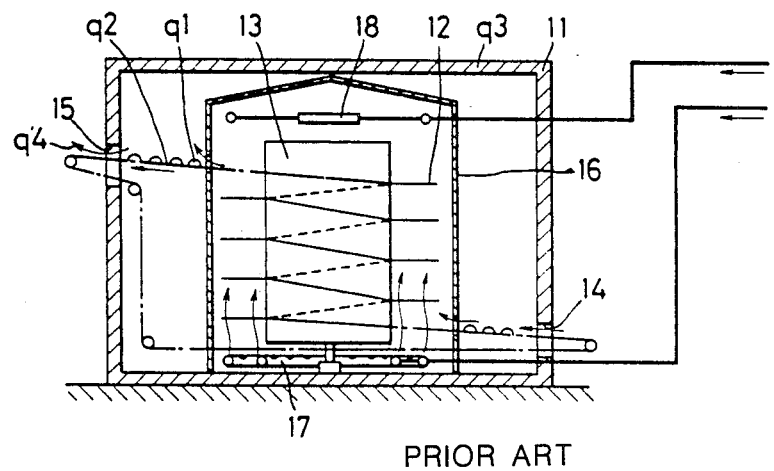
FIG. 3 is a longitudinal cross-sectional view of a conventional steamer.

Calories necessary for the steamer of this invention in FIG. 1 and a conventional steamer in FIG. 3 are compared with each other and are given below.

CONDITION IN USING THE STEAMERS

*Food to be steamed an hour: 100 kg of fried dumplings stuffed with minced pork or shao-mais (example)
*Specific heat of the food: 0.85 Kcal/kg
*Temperature at entrance: 25° C. (outside)
*Temperature at exit: 90° C.
*Temperature in the warmth-retaining room: 90° C.
*Steaming time: 15 minutes
*Pressure of jetting steam: the same in both steamers 1. Calories used to heat up the food (q1)

$$q1 = 100^{(kg/Hr)} \times 0.85^{(Kcal/kg)} \times (90-25) = 522.5^{(Kcal/Hr)}$$

2. Calories used to heat up the conveyor belt (q2) belt speed: 3 m/min, specific heat: 0.11, belt weight: 7 kg/m $$q2 = 7^{(kg/m)} \times 3^{(m/min)} \times 60^{(min)} \times 0.11^{(Kcal/kg)} \times (90-25) = 9009^{(Kcal/Hr)}$$

3. Heat loss through the wall of the warmth-retaining room (q3) inside surface area: 27 m$^2$, heat flow rate: 0.45 Kcal/cm$^2$°C. Hr $$q3 = 27^{(m^2)} \times 0.45^{(Kcal/cm^2 °C. Hr)} \times (90-25) = 790^{(Kcal/Hr)}$$

4. Heat loss through conveyor exit (q4)
  Entalpy outside the warmth-retaining room (at 25° C.): 13 Kcal/kg
  Enthalpy inside the warmth-retaining room (at 90° C.) 28 Kcal/kg
  Flow rate: 0.5 m/sec (with ejector condenser) 2.0 m/sec (without ejector condenser)
  Exit area: 0.075 m²
  Specific volume: 0.86 m³/kg $q4$ (with ejector condenser)
$$\frac{0.075^{(m^2)} \times 0.5^{(m/sec)} \times 3600^{(sec)}}{0.86^{(m^3/kg)}} \times (28 - 13)^{(Kcal/kg)} = 2355^{(Kcal/Hr)}$$

$q'4$ (without ejector condenser)
$$\frac{0.075^{(m^3)} \times 2.0^{(m^3/sec)} \times 3600^{(sec)}}{0.86^{(m^3/kg)}} \times (28 - 13)^{(Kcal/kg)} = 9419^{(Kcal/Hr)}$$

5. Total calories
  *Steamer of this invention (example)

$$qt = q1 + q2 + q3 + q4 = 17679^{(Kcal/Hr)}$$

*Conventional steamer (comparative example)

$$q't = q1 + q2 + q3 + q'4 = 24743^{(Kcal/Hr)}$$

When qt is compared with q't, it becomes obvious that the calories in need of heating up the same amount of the same substance can be saved by 29%.

Figure 2:
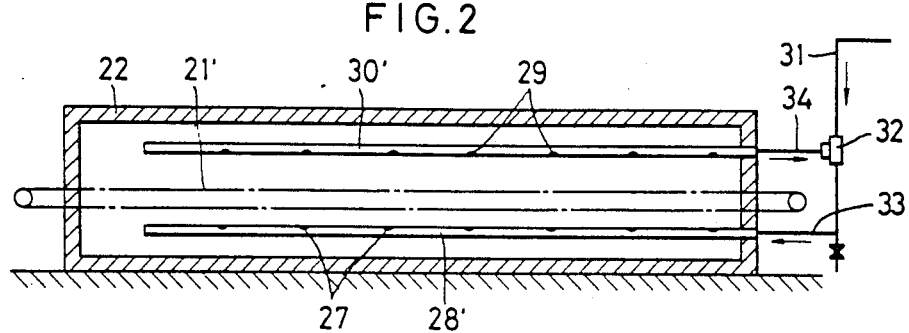
FIG. 2 is a longitudinal cross-sectional view of the second example of a steamer of this invention.

FIG. 2 shows the second example of this invention in which the spiral conveyor 21 of the first example is replaced with a straight conveyor 21', and the circular pipes 28, 30 are replaced with straight pipes 28', 30', but anything else is not changed from the first example.

Therefore, the action and the effect are the same as those in the first example.

I claim:
1. A conveyor steamer comprising:
  a room enclosed with heat-insulated walls, floor, and ceiling, said room having an entrance and an exit for goods to be steamed;
  a conveyor means for carrying the goods to be steamed, said conveyor means traversing into the entrance of the room, through the room, and out of the exit of the room;
  a source of heated primary steam;
  first pipe means, arranged beneath the conveyor means, for jetting said heated primary steam upwardly from across the floor of the room;
  second pipe means disposed across the entire ceiling of the room, arranged above the conveyor means, for scavenging spent steam from across the entire ceiling of the room; and
  an ejector-condenser means, interconnected between the first pipe means, the source of primary heated steam and the second pipe means, for mixing the spent steam from the second pipe means with the heated primary steam in the first pipe means;
  whereby the spent steam mixed with the heated primary steam is caused to recirculate in the first pipe means through the room, thus saving energy and consuming less heated primary steam so that cost reductions will result.

2. The steamer according to claim 1, further comprising:
  a rotary drum arranged within the room.

3. The steamer according to claim 2, wherein:
  said conveyor means spirals around the rotary drum.

4. The steamer according to claim 1, wherein:
  said conveyor means traverses straight through the room.

* * * * *